US005104722A

United States Patent [19]

Kojima et al.

[11] Patent Number: 5,104,722

[45] Date of Patent: Apr. 14, 1992

[54] PHOTOGRAPHIC SUPPORT OF BASE PAPER AND POLYOLEFIN LAYERS

[75] Inventors: Osamu Kojima, Tokyo; Massashi Kubbota, Misato, both of Japan

[73] Assignee: Mitsubishi Paper Mills Limited, Tokyo, Japan

[21] Appl. No.: 482,866

[22] Filed: Feb. 22, 1990

[30] Foreign Application Priority Data

Feb. 22, 1989 [JP] Japan .................................. 1-043454

[51] Int. Cl.[5] .......................... B32B 27/10; G03C 1/86

[52] U.S. Cl. .................................... 428/218; 428/513; 428/516; 264/176.1; 430/496; 430/531; 430/538; 427/44

[58] Field of Search ......................... 428/513, 516, 218

[56] References Cited

U.S. PATENT DOCUMENTS

| | | | |
|---|---|---|---|
| 3,343,663 | 9/1967 | Seidler | 206/46 |
| 4,968,554 | 11/1990 | Shigetani et al. | 428/513 |

FOREIGN PATENT DOCUMENTS

| | | |
|---|---|---|
| 1447815 | 3/1969 | Fed. Rep. of Germany . |
| 1696264 | 12/1971 | Fed. Rep. of Germany . |
| 2145237 | 5/1972 | Fed. Rep. of Germany . |
| 56-62248 | 5/1981 | Japan . |
| 59-198451 | 11/1984 | Japan . |

OTHER PUBLICATIONS

German Official Action, Jun. 5, 1991 (English translation included).

*Primary Examiner*—P. C. Sluby

*Attorney, Agent, or Firm*—Cushman, Darby & Cushman

[57] ABSTRACT

The present invention provides a photographic support which comprises a base paper and polyolefin resin layers provided on both sides of the base paper by extrusion coating of molten polyolefin resins, wherein the polyolefin resin layer provided on the side of the base paper opposite to the side to be coated with photographic emulsion layer has multi-layer construction and a method for producing the photographic support. This photographic support is excellent in anticurl properties and adhesion between the base paper and the resin layer.

11 Claims, No Drawings

PHOTOGRAPHIC SUPPORT OF BASE PAPER AND POLYOLEFIN LAYERS

The present invention relates to a photographic support and a method for producing the same.

Hitherto, so-called baryta paper comprising a base paper and, provided on one side, a baryta layer mainly composed of barium sulfate has been used as a photographic support. Recently, supports comprising a base paper coated, on both sides, with a thermoplastic synthetic resin such as polyethylene, polypropylene or the like for waterproofing, namely, papers called resin-coated papers have come to be mainly used with speeding up of photographic development. These resin-coated papers are generally produced by melt-extruding the thermoplastic resin in the form of a film by an extruder, coating the molten resin on both sides of a base paper and contact-bonding the resin onto the base paper by nip rolls consisting of a cooling roll and, for example, a rubber roll.

The thus obtained photographic support is less in expansion and contraction due to change in humidity than the conventional baryta paper, but when the photographic support is coated with a photosensitive emulsion containing a polymer compound such as gelatin as a main binder, curling occurs owing to large expansion and contraction of the emulsion layer with change in humidity. Especially, when the support coated with the emulsion is excessively dried or when a photographic paper prepared by coating the photographic support with the emulsion is left to stand under a low humidity such as 20% in relative humidity before or after being subjected to development, the support or photographic paper curls with the emulsion-coated side inside the curl. Such curling causes reduction of efficiency and yield in the production of photographic papers and in the operation of enlarging and printing the photographic papers and besides it makes difficult to stack the photographic papers or to paste pictures in an album.

With reference to thickness of thermoplastic synthetic resin layer provided on resin-coated paper, the thickness of the layer on the side to be coated with a photographic emulsion (hereinafter referred to as "right side") is, in many cases, specified by standard, but the thickness on the side opposite to the side to be coated with a photographic emulsion (hereinafter referred to as "back side") is not so important and generally, can be freely changed. However, since the thickness of resin layer on the back side affects the curling of photographic paper, heretofore, the thickness of resin layer on the right side and that of resin layer on the back side have been substantially equal to make the curling uniform.

High-density polyethylene is effective to improve anticurl properties as mentioned in Japanese Patent Application Kokoku No. 48-9963. For example, when the right side of the base paper is coated mainly with low-density polyethylene and the back side is mainly coated with high-density polyethylene, the resin-coated paper before being coated with emulsion curls with the right side outside the curl. When this resin-coated paper is coated with photosensitive emulsion and dried, occurrence of curling decreases owing to contraction of the emulsion layer. Thus, anticurl properties can be improved by increasing the content of high-density polyethylene in resin layer on the back side. Furthermore, even if the amount of resin layer on the back side is reduced, the required anticurl properties can be maintained by increasing the content of high-density polyethylene. Thus, production cost and transport cost can be reduced with retaining anticurl properties.

However, if the content of high-density polyethylene in resin layer is excessively increased, the flowability of resin during extrusion becomes unstable and besides, adhesion between base paper and resin layer becomes poor. Thus, there is a limit in increasing the content of high-density polyethylene in resin layer on the back side and a photographic support having excellent anticurl properties has not yet been obtained.

An object of the present invention is to solve the problems mentioned above.

Other object and advantages of the present invention with become apparent from the following description.

According to the present invention, there is provided a photographic support which comprises a base paper and polyolefin resin layers provided on both sides of the base paper by extrusion coating with molten polyolefin resins, wherein the polyolefin resin layer provided on the side of the base paper opposite to the side to be coated with a photographic emulsion layer has a multi-layer construction.

The present invention further provides a method for producing a photographic support comprising a base paper and polyolefin resin layers provided on both sides of the base paper by extrusion coating with molten polyolefin resins, the polyolefin resin layer provided on the side of the base paper opposite to the side to be coated with a photographic emulsion layer having a multi-layer construction, wherein said multi-layer construction is formed by co-extrusion coating the molten polyolefin resins on the base paper.

In the present invention, polyolefin resin layers are provided on both sides of a base paper. Polyolefin resin layer provided on the back side of the base paper (hereinafter referred to as "resin layer on the back side") has a multi-layer construction. This multi-layer construction comprises a first resin layer provided directly on the base paper, a second resin layer provided directly or indirectly on the first resin layer and, if necessary, and preferably, an outermost resin layer provided directly or indirectly on the second resin layer.

As polyolefin resins used in the present invention, mention may be made of, for example, homopolymers such as low-density polyethylene, medium-density polyethylene, high-density polyethylene, polypropylene, polybutene, polypentene and the like; copolymers comprising two or more olefins such as ethylene-propylene copolymer and the like; and mixtures thereof.

The first resin layer independently contains low-density polyethylene as an essential component in an amount of at least 50% by weight based on the weight of the first resin layer. If the content is less than 50% by weight, sufficient adhesion between the resin layer on the back side and the base paper is not obtained.

The second resin layer contains high-density polyethylene as an essential component in an amount of at least 75% by weight based on the weight of the second resin layer. If the content is less than 75% by weight, substantially the same effect (e.g. improvement of anticurl properties) as when the resin layer on the back side has a single-layer construction can only be obtained. The content of the high-density polyethylene in the second resin layer is preferably at least 80% by weight, more preferably at least 90% by weight, further preferably 100% by weight.

In order to improve anticurl properties effectively, it is preferable that at least 50% of the high-density polyethylene contained in the multi-layer construction be contained in a resin layer the high-density polyethylene content of which is higher than that of any other resin layers.

The outermost resin layer contains low-density polyethylene as an essential component in an amount of preferably at least 40% by weight based on the weight of the resin layer in view of processabilities such as neck in, die lip stain and the like (the composition of the outermost resin layer has no influence on the adhesion to the base paper).

Moreover, at least one resin layer containing high-density polyethylene in an amount of at least 75% by weight based on the weight of said resin layer may be provided at any position between the first resin layer and the outermost resin layer.

The low-density polyethylene contained in the first resin layer, the outermost resin layer and the like has a density of 0.915–0.930 $g/cm^3$ and is usually prepared by high pressure process. The high-density polyethylene contained in the second resin layer and the like has a density of 0.950 $g/cm^3$ or higher and is usually prepared by low pressure process or medium pressure process. The high-density polyethylene especially preferably has a density of 0.955–0.970 $g/cm^3$ in view of improvement in co-extrusion characteristics and anticurl properties.

In the present invention, polyolefin resins having various densities and melt indexes (hereinafter referred to as "MI") may be used singly or in admixture of two or more of them. For example, polyethylene having a density of 0.918 $g/cm^3$ and a MI of 7.0 can be used as polyolefin resin contained in the first resin layer and polyethylene having a density of 0.967 $g/cm^3$ and a MI of 6.0 can be used as polyolefin resin contained in the second resin layer.

Furthermore, the first resin layer and the outermost resin layer may independently contain, in addition to the low-density polyethylene, other polyolefin resins such as the high-density polyethylene mentioned above as the resin contained in the second resin layer. The second resin layer may also contain, in addition to the high-density polyethylene, other polyolefin resins such as the low-density polyethylene mentioned above as the resin contained in the first resin layer and the outermost resin layer.

Methods for providing the first resin layer, the second resin layer and, if necessary, the outermost resin layer on the back side of a base paper include, for example, successive coating and co-extrusion coating and the latter is preferred for formation of very thin resin layers. By setting the compositions of the first resin layer, the second resin layer and the third resin layer as mentioned above, the anticurl properties of the resulting photographic support can be improved with preventing neck-in at coating step.

Specifically, the co-extrusion coating method to extrude the resin layers simultaneously includes various methods. For example, the following methods may be mentioned:

(1) A method in which resins spread so as to have a desired width in a die such as a dual slit die are integrated with each other outside the die. (2) A method in which resins spread so as to have a desired width in a dye such as a multi manifold die are integrated with each other in the die, and then extruded as a multi-layer film from one slit. (3) A method in which resins are integrated with each other in a so-called feed block, which is a structure on the upper part of the die to form a multi-layer construction. The resulting multi-layer construction is spread so as to have a desired width and then extruded as a multi-layer film.

In the present invention, the known coating methods as mentioned above are used in order to produce the photographic support having the structure described above.

For example, in order to form a resin layer which is composed of two resins and has a three-layer construction, one of resins provided by two extrusion machines is divided into two resin flows. And then, the other resin flow is put between the above two resin flows to form a three-layer construction. The resulting three-layer construction is spread in a manifold inside the die so as to have a desired width and cast on a running base paper to carry out coating of the base paper.

In order to form a resin layer which is composed of three resins and has a three-layer construction, the resins provided by three extrusion machines are integrated with each other in a feed block to form a three-layer construction. The resulting three-layer construction is spread and cast on a base paper as described above.

In order to form a resin layer which is composed of three resins and has four-layer construction, a resin flow provided by an extrusion machine is put between other two resin flows provided by two extrusion machines or put on one side of the resin flow composed of the other two resins to form a three-layer construction. On the right side or the back side of the resulting three-layer construction, fourth resin layer is provided. The resulting four-layer construction is spread and then cast on a base paper as described above.

On the other hand, resins contained in the polyolefin resin layer provided on the right side of base paper (hereinafter referred to as "resin layer on the right side") include polyolefin resins such as those mentioned as resins contained in the first resin layer, the second resin layer and the outermost resin layer. It is advantageous that the resin layer on the right side contains 7.5–25% by weight of rutile type or anatase type titanium dioxide pigment for enhancing the sharpness of print image. As the titanium dioxide pigment advantageously contained in the resin layer on the right side, there may be used various titanium dioxide pigments such as those disclosed in Japanese Patent Application Kokoku Nos. 59-42296, 59-37304, 60-3430 and 60-56118 and Japanese Patent Application Kokai Nos. 57-108849, 58-7630, 58-220140, 59-1544, 59-121329, 59-164550, 59-215334 and 61-103635. Furthermore, in addition to the titanium dioxide pigment, the resin layer on the right side preferably contains, in any combination, various additives, e.g., white pigments such as zinc oxide, talc, calcium carbonate and the like; fatty acid amides such as stearic acid amide, arachic acid amide and the like; metal salts of fatty acids such as zinc stearate, calcium stearate, aluminum stearate, magnesium stearate, zinc palmitate, zinc myristate, calcium palmitate and the like; various antioxidants such as hindered phenol type, hindered amine type, phosphorus type, sulfur type antioxidants and the like; blue pigments or dyes such as cobalt blue, ultramarine, cerulean blue, phthalocyanine blue and the like; magenta pigments or dyes such as cobalt violet, fast violet, manganese violet and the like; fluorescent brightening agents; and ultraviolet absorbers. These titanium dioxide pigments and additives can be contained in the resin layer on the right side by various methods as mentioned in the above patent specifications and Japanese Patent Application Kokai Nos. 60-11841, 60-75832 and 60-181131.

Further, the first resin layer, the second resin layer and the outermost resin layer may also contain the above various additives which can be contained in the resin layer on the right side (i.e., white pigments, fatty acid amides, metal salts of fatty acids, antioxidants, coloring pigments and dyes, fluorescent brightening agents and ultraviolet absorbers). It is especially preferred that the first resin layer and the second resin layer contain several ppm to about 0.5% by weight of a metal salt of fatty acid and several ppm to about 1000 ppm of the antioxidant disclosed in Japanese Patent Application Kokai No. 60-11847. Especially, the antioxidant is preferably contained in a large amount in the second resin layer or in the outermost resin layer for improving the adhesion between resin layers and base paper and the releasability between the photographic support and a cooling roll.

The photographic support of the present invention is produced by a so-called extrusion coating method which comprises casting molten polyolefin resins on a running base paper to provide resin layers on both sides of the base paper.

Generally, in order to coat the base paper with the resins, the back side of the running base paper is subjected to corona discharge treatment, and then coated with the molten resins by the extrusion machine to form the resin layer on the back side. After that, the right side of the base paper is subjected to corona discharge treatment, and then coated with a resin to form the resin layer on the right side.

The back side of the base paper coated above is subjected to corona discharge treatment, and an antistatic, back coat layer is coated thereon and then dried. After that, the right side of the base paper is subjected to corona discharged treatment, and then a hydrophilic, undercoat layer is coated thereon and dried to obtain a photographic support.

On the right side of the photographic support obtained above, (1) at least one photosensitive layer and a layer for protecting the photosensitive layer and coated and then dried, or (2) at least one photosensitive layer and/or at least intermediate layer are coated successively or simultaneously and the dried to obtain a photographic material.

As mentioned hereinbefore, the resin layer on the back side has the multi-layer construction. On the other hand, the resin layer on the right side may have either single-layer or multi-layer construction. It is preferred to subject the right side and back side of base paper to corona discharge treatment before coating the base paper with the resin. The right side of the base paper has a gloss surface or a slightly rough surface as disclosed in Japanese Patent Application Kokai No. 55-26507 which does not affect gloss of the surface of the resulting photographic paper, a matte surface or a silky surface and the back side ordinarily has a glossless surface. The right side or, if necessary, both sides can be subjected to activation treatment such as corona discharge treatment, flame treatment or the like. Furthermore, undercoat treatment as disclosed in Japanese Patent Application Kokai No. 61-84643 can be conducted after the activation treatment.

The thicknesses of the respective resin layers on the right side and the back side are not critical, but are preferably about 10–50μ. Considering the effect of the present invention, namely, improvement of anticurl properties and cost, it is preferred that the thickness of the resin layer on the back side be equal to or thinner than that of the resin layer on the right side.

As the base paper, there may be used ordinary natural pulp papers mainly composed of natural pulp, mixed papers comprising natural pulp and synthetic fibers, and so on. Natural pulp papers (hereinafter referred to as merely "paper") are especially preferred because the resulting photographic paper is superior in running properties in developing treatment and thus is easy in handling, a printed photographic paper which hardly causes curling can be obtained and the photographic support can be economically provided.

As a pulp composing the paper used as the sheet, advantageously used is a natural pulp appropriately selected as disclosed in Japanese Patent Application Kokai Nos. 58-37642, 60-67940, 60-69649, 61-35442 and the like. However, if necessary, synthetic pulp or synthetic fiber may be used along with the natural pulp. As the natural pulp, preferably used is a wood pulp such as softwood pulp, hardwood pulp or a mixture thereof, which has been subjected to usual bleaching with chlorine, hypochlorite, chlorine dioxide or the like; alkali extraction or alkali treatment; oxidation bleaching with hydrogen peroxide, oxygen or the like; or a combination of these treatments. Moreover, various pulps may be used such as kraft pulp, sulfite pulp, soda pulp and the like.

Into the base paper used in this invention may be incorporated various sizing agents, high molecular weight compounds or additives in the preparation of a paper slurry.

The sizing agents for the base paper used in this invention include metal salts of fatty acids, fatty acids, alkylketene dimers, alkenyl- or alkyl-succinic anhydrides, epoxized amides or higher fatty acids as disclosed in Japanese Patent Application Kokai No. 54-147211 and organic fluoro compounds as disclosed in Japanese Patent Application Kokai No. 56-109343.

The sizing agent suitable for the base paper used in this invention includes metal salts of fatty acids and fatty acids in such a form that they can be fixed to pulp using a water-soluble aluminium salt such as aluminium chloride, sulfite alumina, poly (aluminium chloride) or the like; alkylketene dimers in such a form that they can be fixed with or without the water-soluble aluminium salt and a combination of the alkylketene dimer and an epoxized amide of a higher fatty acid. The metal salts of higher fatty acids and the fatty acids are preferably those having 12–22 carbon atoms and they are preferably added in an amount of 0.5–4.0% by weight based on the bone-dry weight of the pulp. The proportion the solid weight of the water-soluble aluminium salt optionally added to the weight of the sizing agent is preferably 1/20–4/1, more preferably 1/10–1/1. The alkyl group of the alkylketene dimers has preferably 8–30 carbon atoms, more preferably 12–18 carbon atoms. Usually, alkylketene dimers are on the market in the form of an emulsion, and a specific example is Aquapel 360XC (a trade name of Dic Hercules Chemicals. Inc.). They are added preferably in an amount of 0.2–0.4% by weight based on the bone-dry weight of the pulp. The high molecular weight compound advantageously added to the base paper used in this invention in preparing a paper slurry includes a cationic wet-strength-reinforcing agent or a cationic, anionic or amphoteric strength-reinforcing agent. The cationic wet-strength-reinforcing agent is preferably polyaminepolyamide-epichlorohydrin resin and it is added in an amount of preferably 0.05-4.0% by weight, more preferably 0.15-1.5% by weight, based on the dry weight of the pulp. Specific examples of the cationic wet-strength-reinforcing agent are Kymene 557H, Kymene S-25, Epinox P-130 (these are trade names of Dic Hercules Chemicals. Inc.) and the like.

The cationic, anionic and amphoteric strength-reinforcing agents include cationized starch as disclosed in Japanese Patent Application Kokoku No. 60-17103; cationic poly(vinyl alcohol) as disclosed in Japanese Patent Application No. 62-49699; cationic polyacrylamide as disclosed in Japanese Patent Application Kokai Nos. 57-185432 and 57-197539; anionic polyacrylamide as disclosed in Japanese Patent Application Kokoku Nos. 62-23119 and 62-31118; amphoteric polyacrylamide as disclosed in Japanese Patent Application Kokoku No. 61-37613 and Japanese Patent Application Kokai No. 59-31949; vegetable galactomannan as disclosed in Japanese Patent Application Kokai No. 59-125731; and the like. They are added in an amount of preferably 0.05-8% by weight, more preferably 0.15-4% by weight, based on the dry weight of the pulp.

To the base paper used in this invention may be added various additives in the preparation of the paper slurry. There may be added, in proper combination, a filler such as clay, kaolin, potassium carbonate, barium sulfate, magnesium silicate, titanium dioxide or the like; a pH modifier such as sodium hydroxide, sodium carbonate or the like; a coloring pigment, a coloring dye or a fluorescent whitening agent as disclosed in Japanese Patent Application Kokai No. 54-147033 and Japanese Patent Application Nos. 62-37555 and 63-96516.

To the base paper used in this invention may be added various water-soluble polymers, antistatic agents, lattices, emulsions, pigments, pH modifiers and the like by spraying or tab size pressing. The water-soluble polymer includes starchy polymers as disclosed in Japanese Patent Application No. 63-96516, poly(vinyl alcohol)-type polymers, gelatinic polymers, polyacrylamide-type polymers, cellulosic polymers and the like. The antistatic agent includes alkali metal salts such as sodium chloride, potassium chloride and the like; alkaline earth metal salts such as calcium chloride, barium chloride and the like; colloidal metal oxides such as colloidal silica and the like; organic antistatic agents as disclosed in Japanese Patent Application Kokai No. 58-82242; and the like. The lattices and emulsions include petroleum resin emulsion and lattices of styrene/acrylic acid-/acrylic acid ester terpolymer, styrene/acrylic acid/-butadiene terpolymer, ethylene/vinyl alcohol copolymer, styrene/maleic acid/acrylic acid ester terpolymer and the like. The pigment includes clay, kaolin, talc, barium sulfate, titanium dioxide and the like. The pH modifier includes hydrochloric acid, phosphoric acid, citric acid, sodium hydroxide, sodium carbonate and the like. These additives are advantageously used in appropriate combination with the coloring pigment, coloring dye or fluorescent agent mentioned above.

In order to make the base paper used in this invention, there may be used a conventionally used paper machine such as Fourdrinier machine, a cylinder machine or the like however, it is advantageous to adopt an appropriate method for making paper as disclosed in Japanese Patent Application Kokai Nos. 58-37642, 61-260240 and 61-284762. Though the thickness of the base paper is not critical, the base paper is preferably treated by a calender after the base paper is made as shown in Japanese Patent Application Kokai Nos. 58-37642 and 60-126397. The basis weight of the base paper is preferably 40-250 $g/m^2$.

For the purpose of the prevention of electrification, curling or the like, various backcoats layers may additionally be applied to the photographic support of this invention. The backcoat layers may contain in appropriate combination an inorganic antistatistic agent, an organic antistatistic agent, a hydrophilic binder, a latex, a hardening agent, a pigment, a surfactant and the like as disclosed in Japanese Patent Application Kokoku Nos. 52-18020, 57-9059, 57-53940, 58-56859; Japanese Patent Application Kokai Nos. 59-214849 and 58-184144; and the like.

After various photograph-constituting layers are formed by coating, the photographic support of this invention can be applied to various uses such as a color photographic paper, a monochromic photographic paper, a phototype-setting photographic paper, a copy photographic paper, a reversal photographic material, a negative and positive photographic material for silver salt dispersion transfer, a positive photographic material for heat development dispersion transfer, a photographic sheet for silver dye bleach, a printing material and the like. When a glossy photographic paper or a photographic paper for silver dye bleach which requires particularly high-grade appearance is used, a polyolefin-coated sheet in which the substrate is a polyester film is advantageously used. The photographic support may have an emulsion layer containing silver chloride, silver bromide, silver iodobromide, silver iodochloride or the like. The photographic emulsion layer containing a silver halide may contain a color coupler to form a silver halide constituting layer having a multilayer structure. The emulsion layer may contain a physical developing nucleus to form a receiving layer for silver salt dispersion transfer. As a binder of these photographic-constituting layers, there may be used a hydrophilic polymer such as poly(vinyl pyrrolidone), poly(vinyl alcohol), a sulfuric acid ester of a polysaccharide or the like in addition to a conventional gelatin. The photographic-constituting layer may contain various additives. For example, there may be contained, in appropriate combination, an optical sensitizing dye such as a cyanine dye, a merocyanine dye or the like; a chemical sensitizer such as a water-soluble gold compound, a sulfur compound or the like; an anti-foggant or a stabilizer such as a hydroxytriazolopyrimidine, a mercaptoheterocyclic compound or the like; a hardening agent such as formaldehyde, a vinylsulfone compound, an aziridine compound; an auxiliary agent for coating such as a salt of benzensulfonic acid, sulfosuccinic acid or the like; an anticontaminant such as a dialkylhydroquinone compound or the like; other components such as a fluorescent agent, a dye for improving the sharpness, an antistatic agent, a pH modifier, a fogging agent, or a water-soluble iridium or rhodium compound in the production dispersion of a silver halide.

The photographic material containing a silver halide obtained from the photographic support of this invention is subjected to treatments such as exposure, development, termination, bleach, stabilization and the like as shown in "Photosensitive Materials for Photography and Handling Thereof" by Goro Miyamoto, published by Kyoritsu Shuppan Co. Ltd., Photographic Techniques Course Vol. 2, depending upon the photographic material thereof. Especially, the multilayer silver halide photographic material which is applied to a single bath bleaching treatment after the coloring development may also be applied to a treatment with a color development solution of any main ingredient such as CD-III, CD-IV (these two compounds are products of Kodak Co. Ltd.), Droxychrom (a trade name of May & Bayker Co. Ltd.) or the like. The development solution comprising the main ingredient may contain a development accelerator such as benzyl alcohol, a thallium salt, phenidone or the like. However, the photographic material may also be treated with a development solution which contains substantially no benzyl alcohol. A useful one-bath bleaching-fixing solution is a solution of a metal salt of aminopolycarboxylic acid (e.g. a ferric salt of ethylenediaminetetraacetic acid, propylenediaminetetraacetic acid, etc.). The useful fixing agent is sodium thiosulfate, ammonium thiosulfate or the like. The one-bath bleaching-fixing solution may contain various additives. For example, there may be contained in combination a desilver accelerator (e.g. mercaptocarboxylic acid as disclosed in U.S. Pat. No. 3,512,979, a mercaptoheterocyclic compound as disclosed in Belgian Patent No. 682,426, etc.), an anticontaminant, a pH modifier, a pH buffer, a hardening agent (e.g. magnesium sulfate, aluminium sulfate, potassium alum, etc.), a surfactant and the like. The one-bath bleaching-fixing solution may be used at various pH values though the useful pH range is 6.0-8.0.

The following Examples further illustrate the invention.

EXAMPLES 1-3 AND COMPARATIVE EXAMPLES 1-3

The back side of a base paper for photography having a basis weight of 170 g/m$^2$ was subjected to corona discharge treatment. Resin layers or a resin layer having glossless surface were formed on this corona treated back side by melt co-extrusion coating of resins shown in Table 1 (Examples 1-3) or by single-layer extrusion coating (Comparative Examples 1-3) at a coating amount as shown in Table 1 at a resin temperature of 320° C.

The right side of the base paper thus provided with layers or layer on the back side was subjected to corona discharge treatment. 20 Parts by weight of a master batch consisting of 50 parts by weight of anatase type titanium dioxide pigment, 47.5 parts by weight of low-density polyethylene (density: 0.918 g/cm$^3$, MI: 9) and 2.5 parts by weight of zinc stearate, 25 parts by weight of high-density polyethylene (density: 0.96 g/cm$^3$, MI: 7), and 55 parts by weight of low-density polyethylene (density: 0.918 g/cm$^3$, MI: 5) were mixed. The resulting mixture was coated on the right side of the base paper by melt extrusion coating at a coating amount of 30 g/m$^2$ at a resin temperature of 320° C. to form a resin layer having gloss surface on the right side.

TABLE 1

| | The first resin layer | | The second resin layer | |
|---|---|---|---|---|
| | Resins | Coating amount g/m$^2$ | Resins | Coating amount g/m$^2$ |
| Comparative Example 1 | High-density polyethylene *1 50 parts by weight Low-density polyethylene *2 50 parts by weight | 29 | — | — |
| Comparative Example 2 | High-density polyethylene *1 75 parts by weight Low-density polyethylene *2 25 parts by weight | 27 | — | — |
| Comparative Example 3 | High-density polyethylene *1 100 parts by weight | 15 | — | — |
| Example 1 | Low-density polyethylene *2 100 parts by weight | 11.5 | High-density polyethylene *1 100 parts by weight | 11.5 |
| Example 2 | Low-density polyethylene *2 100 parts by weight | 5 | High-density polyethylene *1 100 parts by weight | 15 |
| Example 3 | High-density polyethylene *1 50 parts by weight Low-density polyethylene *2 50 parts by weight | 11 | High-density polyethylene *1 100 parts by weight | 11 |

Notes:
*1 High-density polyethylene having a density of 0.967 g/cm$^3$ and an MI of 7.
*2 Low-density polyethylene having a density of 0.918 g/cm$^3$ and an MI of 5.

Evaluation Methods (i) Curl: The photographic support obtained above was cut into 3 cm in flow direction and 10 cm in width direction. The resulting test piece was left to stand for 24 hours at 25° C. and 65% RH in humidity and was put on a horizontal stand so that the central portion of the test piece contacted with the surface of the stand and distance between the end portion of the test piece and the stand was measured. The distance between them when curling occurred with the right side outside the curl was expressed by "+" and that when curling occurred with the back side outside the curl was expressed by "−".

(ii) Adhesion: The back side of the base paper from which the resin layers had been slowly peeled was observed and the results were ranked as follows:

A: The whole surface had no gloss and fluffed.

B: Some portions had gloss.

C: Considerable portions had gloss.

D: The whole surface had gloss and no fluff.

Photographic supports which were ranked to be A and B among the four ranks are practically satisfactory in adhesion between the base paper and the resin layers on the back side.

(iii) Neck-in: Neck-in which occurred at the step of forming the resin layers on the back side (namely, difference between width of extruded resin at outlet of die and width of resin layer formed on the back side) was measured.

The results are shown in Table 2.

TABLE 2

| | Total coating g/m² | Content of high-density polyethylene in the resin layers on the back side (% by weight) | Curl mm | Neck-in mm | Adhesion |
|---|---|---|---|---|---|
| Comparative Example 1 | 29 | 50 | −2.4 | 27 | A |
| Comparative Example 2 | 27 | 75 | −2.3 | 35 | A |
| Comparative Example 3 | 15 | 100 | −4.0 | 53 ± 4 | C |
| Example 1 | 23 | 50 | −2.6 | 43 | A |
| Example 2 | 20 | 75 | −3.5 | 47 | A |
| Example 3 | 22 | 75 | −2.8 | 45 | A |

From the comparison of comparative Example 1 with Example 1 and that of Comparative Example 2 with Examples 2 and 3, it can be seen that in case proportion of coating amount of high-density polyethylene is the same, coating amount of resin can be reduced with maintaining superior anticurl properties when the resin layers are formed by co-extrusion of the two layers and the second resin layer is high-density polyethylene alone.

When high-density polyethylene alone is coated on the back side of base paper as in Comparative Example 3, anticurl properties can be maintained even if coating amount is reduced, but neck-in becomes large and width of resin layer is unstable to deteriorate extrusion characteristics. Furthermore, adhesion between the base paper and the resin layer is inferior and such support is not suitable for practical use.

EXAMPLES 4–6 AND COMPARATIVE EXAMPLES 4–5

Example 1 was repeated except that compositions of the first resin layer and the second resin layer and coating amount thereof were as shown in Table 3.

TABLE 3

| | The first resin layer | | The second resin layer |
|---|---|---|---|
| | Resins | Coating amount g/m² | High-density polyethylene *3 Coating amount g/m² |
| Example 4 | Low-density polyethylene *3 100 wt % | 11.5 | 11.5 |
| Example 5 | Low-density polyethylene *3 60 wt % High-density polyethylene *4 40 wt % | 11 | 11 |
| Example 6 | Low-density polyethylene *3 50 wt % High-density polyethylene *4 50 wt % | 11 | 11 |
| Comparative Example 4 | Low-density polyethylene *3 40 wt % High-density polyethylene *4 60 wt % | 11 | 11 |
| Comparative Example 5 | High-density polyethylene *4 100 wt % | 7.5 | 7.5 |

Notes:
*3 Same as *1 in Table 1
*4 Same as *2 in Table 1

The results are shown in Table 4.

TABLE 4

| | Content of low-density polyethylene in the first resin layer (%) | Total coating amount g/m² | Curl mm | Neck-in mm | Adhesion |
|---|---|---|---|---|---|
| Example 4 | 100 | 23 | −2.6 | 43 | A |
| Example 5 | 60 | 22 | −2.7 | 44 | A |
| Example 6 | 50 | 22 | −2.8 | 45 | A |
| Comparative Example 4 | 40 | 22 | −2.8 | 46 | B-C |
| Comparative Example 5 | 0 | 15 | −4.0 | 53 ± 4 | C |

As can be seen from Table 4, if content of low-density polyethylene in the first resin layer is less than 50%, adhesion between the base paper and the resin layer on the back side is insufficient.

EXAMPLES 7–10 AND COMPARATIVE EXAMPLES 6–7

Example 1 was repeated except that compositions of the first resin layer, the second resin layer and the outermost resin layer and coating amount thereof were as shown in Table 5.

TABLE 5

| | The first resin layer | The second resin layer | The outermost resin layer |
|---|---|---|---|
| Comparative Example 6 | Blend 10 g/m² | Blend 10 g/m² | Blend 10 g/m² |
| Comparative Example 7 | Low-density 4 g/m² | Blend 7 g/m² | High-density 11 g/m² |
| Example 7 | Low-density 6 g/m² | High-density 12 g/m² | Low-density 6 g/m² |
| Example 8 | Low-density 4 g/m² | High-density 11 g/m² | Blend 7 g/m² |
| Example 9 | Blend 5.5 g/m² | High-density 11 g/m² | Blend 5.5 g/m² |
| Example 10 | Blend 7 g/m² | High-density 11 g/m² | Low-density 4 g/m² |

Notes:
Low-density: Low-density polyethylene having a density of 0.918 $g/m^3$ and an MI of 5.
High-density: High-density polyethylene having a density of 0.967 $g/m^3$ and an MI of 7.
Blend: A blend of the above two polyethylene at a weight ratio of 1:1.

The results are shown in Table 6.

TABLE 6

| | Total coating g/m² | Proportion of high-density polyethylene in total resin on the back side (%) | Curl mm | Neck-in mm | Adhesion |
|---|---|---|---|---|---|
| Comparative Example 6 | 30 | 50 | −2.5 | 27 | A |
| Comparative Example 7 | 22 | 65.9 | −2.7 | 45 | A |
| Example 7 | 24 | 50 | −2.7 | 33 | A |
| Example 8 | 22 | 65.9 | −2.7 | 35 | A |
| Example 9 | 22 | 75 | −2.8 | 38 | A |

TABLE 6-continued

| | Total coating g/m² | Proportion of high-density polyethylene in total resin on the back side (%) | Curl mm | Neck-in mm | Adhesion |
|---|---|---|---|---|---|
| Example 10 | 22 | 65.9 | −2.8 | 35 | A |

As can be seen from Table 6, anticurl properties can be improved with inhibiting occurrence of neck-in when the outermost resin layer is provided and the second resin layer contains high-density polyethylene in a high concentration.

EXAMPLES 11-14 AND COMPARATIVE EXAMPLES 8-10

Example 1 was repeated except that compositions of the first resin layer and the second resin layer and coating amount thereof were as shown in Table 7.

TABLE 7

| | Weight ratio of low-density polyethylene and high-density polyethylene in the first resin layer *5 | Weight ratio of low-density polyethylene and high-density polyethylene in the second resin layer *5 | Total coating g/m² |
|---|---|---|---|
| Comparative Example 8 | 50/50 | 50/50 | 29 |
| Comparative Example 9 | 60/40 | 40/60 | 29 |
| Comparative Example 10 | 70/30 | 30/70 | 29 |
| Example 11 | 75/25 | 25/75 | 28.5 |
| Example 12 | 80/20 | 20/80 | 27.5 |
| Example 13 | 90/10 | 10/90 | 26 |
| Example 14 | 100/0 | 0/100 | 23.5 |

Note.
*5 Coating amount of the first resin layer was the same as that of the second resin layer.

Low-density polyethylene used had a density of 0.92 g/m³ and an MI of 3 and high-density polyethylene used had a density of 0.955 g/m³ and an MI of 3.

The results are shown in Table 8.

TABLE 8

| | Content of high-density polyethylene in the second resin layer | Total coating g/m² | Curl mm | Neck-in mm | Adhesion |
|---|---|---|---|---|---|
| Comparative Example 8 | 50% by weight | 29 | −2.4 | 27 | A |
| Comparative Example 9 | 60% by weight | 28.9 | −2.4 | 30 | A |
| Comparative Example 10 | 70% by weight | 28.8 | −2.4 | 33 | A |
| Example 11 | 75% by weight | 28.5 | −2.4 | 35 | A |
| Example 12 | 80% by weight | 27.5 | −2.5 | 36 | A |
| Example 13 | 90% by weight | 26 | −2.5 | 39 | A |
| Example 14 | 100% by weight | 23.5 | −2.6 | 43 | A |

It can be seen that in all of Examples 11-14 and Comparative Examples 8-10, content of high-density polyethylene in the resin layers on the back side is 50% by weight and when content of high-density polyethylene in the second resin layer is 75% by weight or higher, coating amount of resin can be efficiently reduced with retaining good anticurl properties.

EXAMPLES 15-18 AND COMPARATIVE EXAMPLES 11-20

Example 1 was repeated except for the following. That is, in Examples 15-18 and Comparative Examples 11-13, the first resin layer composed of 100% of low-density polyethylene and the second resin layer composed of a blend at a weight ratio as shown in Table 9 were coated so that coating weight of the first resin layer and that of the second resin layer were the same, and with changing the total coating amount of the resin layers on the back side, the coating amount at which the curl was −2.4 mm was obtained.

In Comparative Examples 14-20, a blend at such a weight ratio as providing the same high-density polyethylene content on the back side as that of each sample shown in the left column in Table 9 was single-layer extrusion coated to form resin layer on the back side.

The results are shown in Table 9.

The low-density polyethylene and high-density polyethylene used were the same as those which were used in Example 1, respectively.

TABLE 9

| | Weight ratio of low-density polyethylene and high-density polyethylene in the second resin layer | Total coating amount g/m² | | Weight ratio of low-density polyethylene and high-density polyethylene in the second resin layer | Total coating amount g/m² |
|---|---|---|---|---|---|
| Comparative Example 11 | 50/50 | 31.8 | Comparative Example 14 | 75/25 | 32 |
| Comparative Example 12 | 40/60 | 31.3 | Comparative Example 15 | 70/30 | 31.5 |
| Comparative Example 13 | 30/70 | 30.4 | Comparative Example 16 | 65/35 | 30.8 |
| Example 15 | 25/75 | 29.7 | Comparative Example 17 | 62.5/37.5 | 30.5 |
| Example 16 | 20/80 | 29.0 | Comparative Example 18 | 60/40 | 30.3 |
| Example 17 | 10/90 | 26.8 | Comparative Example 19 | 55/45 | 29.6 |
| Example 18 | 0/100 | 22.7 | Comparative Example 20 | 50/50 | 29 |

As is clear from Table 9, when content of high-density polyethylene in the second resin layer is 75% by weight or higher, coating amount of resin can be especially markedly reduced with maintaining good anticurl properties.

EXAMPLE 19 AND COMPARATIVE EXAMPLE 21

Production of base paper for support:

A mixture of softwood sulfite pulp and hardwood kraft pulp (1:1) was beaten to a Canadian Standard Freeness of 310 ml and a paper of 170 $g/m^2$ was made at the following formulation by a wire paper machine. (The numerical values in the formulation show amounts in part by weight.)

| | |
|---|---|
| Pulp | 100 |
| Cationized starch | 2 |
| Anionic polyacrylamide resin | 0.5 |
| Alkyl ketene dimer emulsion (as ketene dimer content) | 0.4 |
| Polyamidepolyamine epichlorohydrin resin | 0.4 |

The paper was passed through a main drier, then impregnated with an impregnating solution having the following composition in an amount of 35 $g/m^2$, dried by an after drier and subjected to smoothing treatment by a machine calender and thereafter was wound up. (In the following composition, the numerical values show amount in part by weight.)

| | |
|---|---|
| Carboxy-modified polyvinyl alcohol | 3 |
| Diaminostilbenedisulfonate type fluorescent brightening agent | 0.05 |
| Blue dye | 0.002 |
| Sodium chloride | 2 |
| Water | 94.948 |

Production of resin coated paper type photographic support:

The rolled paper was taken out from stock roll and the back side was subjected to corona discharge treatment. In Comparative Example 21, a mixture (1:1) of high-density polyethylene (density: 0.96 $g/cm^3$ and MI: 7) and low-density polyethylene (density: 0.92 $g/cm^3$ and MI: 5) was melt extrusion coated on the corona treated surface at a coating amount of 30 $g/m^2$ and at a resin temperature of 320° C. to form a resin layer having glossless surface on the back side of the paper. In Example 19, a mixture (1:1) of high-density polyethylene (density: 0.96 $g/cm^3$ and MI: 7) and low-density polyethylene (density: 0.92 $g/cm^3$ and MI: 5) as the first resin layer and high-density polyethylene (density: 0.96 $g/cm^3$ and MI: 7) as the second resin layer were melt co-extrusion coated on the corona treated surface at a coating amount of 11 $g/m^2$, respectively, thereby to obtain resin layer on the back side having a glossless surface.

Then, the right side of the paper was subjected to corona discharge treatment. 20 Parts of a master batch composed of 50 parts of rutile type titanium oxide and 50 parts of low-density polyethylene (density: 0.918 $g/cm^3$ and MI: 9), 30 parts of high-density polyethylene (density: 0.96 $g/cm^3$ and MI: 7) and 50 parts of low-density polyethylene (density: 0.918 $g/cm^3$ and MI: 5) were mixed. The resulting mixture was melt extrusion coated at a coating amount of 30 $g/m^2$ on the corona treated surface at a resin temperature of 320° C. to obtain a resin layer having a gloss surface on the right side of the paper.

Furthermore, the back side was subjected to corona discharge treatment and thereon was coated a back coating composition of the following formulation and the coat was dried. The coating amount was 3 $g/m^2$ in wet content. (The numerical values in the formulation show amounts based on part by weight.)

| | |
|---|---|
| Alkali hydrolyzate of styrene-maleic anhydride copolymer (as 25% solution) | 4 |
| Colloidal silica (as 20% solution) | 50 |
| Styrene acrylic latex (as 30% solution) | 1 |
| A compound having an effective epoxy group number of about 2.5 | 0.25 |
| Sodium 2-ethylhexylsuccinate surface active agent | 0.01 |
| Water | 44.74 |

Then, the surface was subjected to corona discharge treatment and a subbing composition which was a 1 wt % gelatin solution was coated thereon by an air knife coater and dried. Portions in both side parts of the thus obtained resin coated type photographic support where resin coating amount was not proper were cut off by a slitter and the remaining portion was wound up.

Production of silver halide color photographic photosensitive material:

On the 45th day after production of the resin coated type photographic support, the following layers were coated in succession on the right side of the support to obtain a liver halide color photographic photosensitive material.

Layer 1: A layer containing 1.2 $g/m^2$ of gelatin, 0.32 $g/m^2$ (in terms of silver) of blue sensitive silver chlorobromide emulsion (content of silver bromide: 90 mol %; average grain size: 0.6 μm), and 0.80 $g/m^2$ of yellow coupler having the structural formula (I) dissolved in 0.50 $g/m^2$ of dioctyl phthalate.

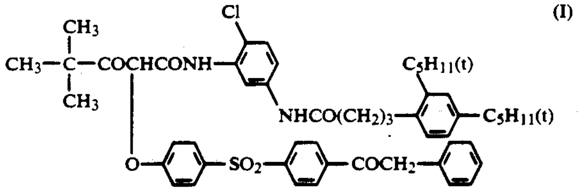

(I)

Layer 2: An inter layer comprising 0.7 $g/m^2$ of gelatin, 8 $mg/m^2$ of a water-soluble dye having the structural formula (II) and 4 $mg/m^2$ of a water-soluble dye having the structural formula (III).

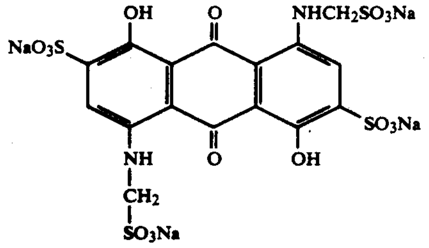

(II)

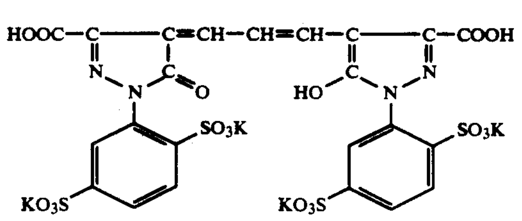

(III)

Layer 3: A layer containing 1.25 $g/m^2$ of gelatin, 0.22 $g/m^2$ (in terms of silver) of green sensitive silver chlorobromide emulsion (content of silver bromide: 50 mol %; average grain size: 0.4 μm), and 0.62 $g/m^2$ of magenta coupler having the structural formula (IV) dissolved in 0.30 $g/m^2$ of dioctyl phthalate.

(IV)

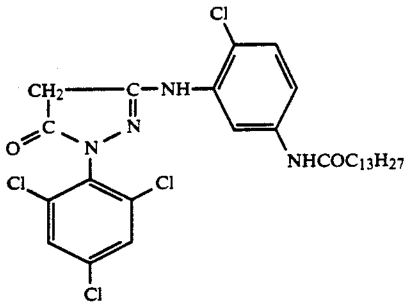

Layer 4: An inter layer comprising 1.2 $g/m^2$ of gelatin.

Layer 5: A layer containing 1.4 $g/m^2$ of gelatin, 0.02 $g/m^2$ (in terms of silver) of red sensitive silver chlorobromide emulsion (content of silver bromide: 50 mol % and average grain size: 0.4 μm), and 0.45 $g/m^2$ of cyan coupler having the structural formula (V) dissolved in 0.20 $g/m^2$ of dioctyl phthalate.

(V)

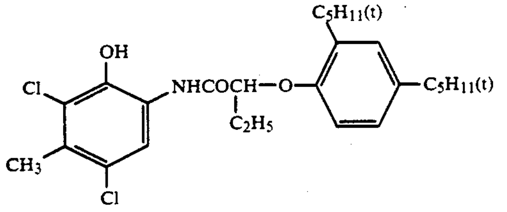

Layer 6: A layer containing 1.0 $g/m^2$ of gelatin and 0.30 $g/m^2$ of an ultraviolet absorber having the structural formula (VI) dissolved in 0.20 $g/m^2$ of dioctyl phthalate.

(VI)

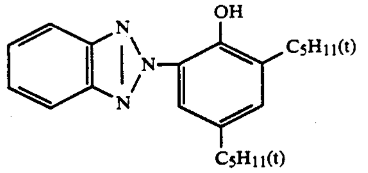

Layer 7: A layer containing 0.5 $g/m^2$ of gelatin.

Layers 2, 4 and 7 contained 2,4-dichloro-6-hydroxy-S-triazine sodium as a hardener in an amount of 0.012 g per 1 g of gelatin, respectively.

The resulting silver halide color photographic photosensitive materials were cut and subjected to the following treatments.

Treating steps (33° C.):

Color developing: 3 minutes and 30 seconds

Bleach-fixing: 1 minute and 30 seconds

Water washing: 3 minutes

Drying: 60°-80° C., 1 minute and 30 seconds

Compositions of the treating solutions are as follows:

| [Color developing solution] | |
|---|---|
| Pure water | 800 ml |
| Hydroxylamine sulfate | 2.0 g |
| Potassium bromide | 1.5 g |
| Sodium chloride | 1.0 g |
| Potassium sulfite | 2.0 g |
| Triethanolamine | 2.0 g |
| N-ethyl-N-β-methanesulfonamidoethyl-3-methyl-4-aminoaniline sulfate | 4.5 g |
| 1-Hydroxyethylidene-1,1-diphosphonic acid (60% aqueous solution) | 1.5 ml |
| Potassium carbonate | 32 g |
| Whitex BB (50% aqueous solution) (fluorescent brightening agent manufactured by Sumitomo Chemical Co., Ltd.) | 2 ml |

Water was added to the above composition to make up 1 liter and pH was adjusted to 10.1 with 20% potassium hydroxide or 10% dilute sulfuric acid.

| [Bleach-fixing solution] | |
|---|---|
| Pure water | 550 ml |
| Ammonium iron (III) ethylenediaminetetraacetate | 65 g |
| Ammonium thiosulfate | 85 g |
| Sodium hydrogensulfite | 10 g |
| Sodium metabisulfite | 2 g |
| Disodium ethylenediaminetetraacetate | 20 g |
| Sodium bromide | 10 g |

Pure water was added to the above composition to make up 1 liter and pH was adjusted to 7.0 with ammonia water or dilute sulfuric acid.

The photographic photosensitive materials subjected to the above treatments were left for 24 hours at 20° C. and 65% RH and degree of curling was measured in the same manner as in Example 1. Curling value was −2.1 mm in Comparative Example 21 and −2.2 mm in Example 19 and it can be seen that according to the present invention, coating amount of resin on the back side can be diminished with maintaining the good anticurl properties.

According to the present invention, there can be obtained a photographic support which is excellent in adhesion between base paper and resin layer and which maintains anticurl properties required as quality level with diminished coating amount of resin. Besides, it becomes possible to produce such superior photographic support with stable extrusion flowability of resin.

What is claimed is:

1. A photographic support which comprises a base paper and polyolefin resin layers provided on both sides of the base paper by extrusion coating with molten polyolefin resins, wherein the polyolefin resin layer provided on the side of the base paper opposite to the side to be coated with a photographic emulsion layer has a multi-layer construction comprising a first resin layer containing low-density polyethylene in an amount of at least 50% by weight based on the first resin layer and a second resin layer containing high-density polyethylene in an amount of at least 75% by weight based on the weight of the second resin layer, the first resin layer being provided between the base paper and the second resin layer.

2. A photographic support according to claim 1, wherein the first resin layer provided directly on the back side of the base paper and the second resin layer is provided directly or indirectly on the first resin layer.

3. A photographic support according to claim 2, wherein the multi-layer construction additionally comprises an outermost resin layer provided directly or indirectly on the second resin layer.

4. A photographic support according to claim 3, wherein the outermost resin layer contains low-density polyethylene in an amount of at least 40% by weight based on the weight of the outermost resin layer.

5. A photographic support according to claim 4, wherein at least one resin layer containing high-density polyethylene in an amount of at least 75% by weight based on the weight of said resin layer is provided at any position between the first resin layer and the outermost resin layer.

6. A photographic support according to claim 4, or 5, wherein the second resin layer contains high-density polyethylene in an amount of at least 90% by weight based on the weight of the second resin layer.

7. A photographic support according to claim 4, or 5, wherein the low-density polyethylene has a density of 0.915–0.930 $g/cm^3$ and the high-density polyethylene has a density of at least 0.950 $g/cm^3$.

8. A photographic support according to claim 7, wherein the high-density polyethylene has a density of 0.955–0.970 $g/cm^3$.

9. A photographic support according to claim 4, or 5, wherein the base paper is a natural pulp paper mainly composed of natural pulp or a mixed paper composed of natural pulp and synthetic fiber.

10. A photographic support according to claim 9, wherein the base paper is a natural pulp paper.

11. A photographic support according to claim 4, or 5, wherein at least 50% of the high-density polyethylene contained in the multi-layer construction is contained in a resin layer the high-density polyethylene content of which is higher than that of any other resin layers.

* * * * *